United States Patent
Lefebure et al.

(10) Patent No.: US 7,606,439 B2
(45) Date of Patent: Oct. 20, 2009

(54) METHOD FOR EXTRACTING RAW DATA FROM AN IMAGE RESULTING FROM A CAMERA SHOT

(75) Inventors: Martin Lefebure, Courbevoie (FR); Anas Benabid, Paris (FR)

(73) Assignee: Realeyes 3D, Saint Cloud Cedex (FR)

( * ) Notice: Subject to any disclaimer, the term of this patent is extended or adjusted under 35 U.S.C. 154(b) by 569 days.

(21) Appl. No.: 11/086,985

(22) Filed: Mar. 23, 2005

(65) Prior Publication Data

US 2005/0212925 A1     Sep. 29, 2005

(30) Foreign Application Priority Data

Mar. 23, 2004  (FR)  ................................ 04 02960
Dec. 7, 2004   (FR)  ................................ 04 13047

(51) Int. Cl.
*G06K 9/40*      (2006.01)
*H04N 5/228*     (2006.01)

(52) U.S. Cl. ............... 382/274; 382/254; 348/222.1
(58) Field of Classification Search ............... 382/254, 382/274, 275; 348/207.1, 533, 607, 222.1; 725/105, 116
See application file for complete search history.

(56) References Cited

U.S. PATENT DOCUMENTS 6,038,295 A    3/2000  Mattes
6,999,111 B2 * 2/2006  McIntyre et al. ......... 348/207.1
7,028,081 B2 * 4/2006  Kawashima ................ 709/223
7,127,271 B1 * 10/2006 Fujisaki .................... 455/556.1
2001/0016852 A1  8/2001  Peairs et al.
2002/0108118 A1 * 8/2002  Cohen et al. ................ 725/105

FOREIGN PATENT DOCUMENTS

FR      2 818 480 A1   6/2002
WO      WO 00/31966    6/2000

* cited by examiner

*Primary Examiner*—Yon Couso
(74) *Attorney, Agent, or Firm*—Browdy and Neimark, P.L.L.C.

(57) ABSTRACT

The method according the invention allows the extracting raw data from an image resulting from a camera shot.

It comprises determining, for each point of the image of a combination $V_0[C,L]$ of color components of the image, calculating, for each point of the image, of a value $V_{N+1}[C,L]$, iterating said calculating a predetermined number of times then taking into account the values of the final image $V_{Nfinal}[C, L]$ in each point of the image, calculating for each point of the image of the difference D $[C, L]=V_{Nfinal}[C, L]-V_0[C, L]$, calculating of a noise contextual datum $V_S$, correcting the extracted raw data D[C, L], with the contextual datum $V_S$, calculating of a corrected value I*[C, L] taking into D*[C, L] and presenting the extracted data under a desired angle.

41 Claims, 5 Drawing Sheets

METHOD FOR EXTRACTING RAW DATA FROM AN IMAGE RESULTING FROM A CAMERA SHOT

BACKGROUND OF THE INVENTION

1. Field of the Invention

The present invention relates to a method for extracting raw data from an image resulting from a camera shot.

More specifically but not exclusively, it relates to a method for presenting data extracted from an image along a desired view angle, from a digital image taken by a photographic or cinematographic camera whether integrated or not into a communication device under any incidence.

It is notably applied to transmission and storage of text data and digitized graphics viewed beforehand by a camera under any incidence and then processed by correcting the projective deformation and/or optionally by enhancing the resolution in order to obtain a corrected image having higher legibility, viewed along an angle of incidence different from that of the camera shot, for example under normal incidence or any predetermined incidence. Of course, with the invention useful information may be extracted before or after correction. Such a process is most particularly suitable for transmitting text and/or graphic information taken by a camera fitted onto a portable communications terminal, such as for example, a cellular radio transmitter/receiver.

2. Description of the Prior Art

Of course, in order to extract raw data relating to printed or handwritten information in an image and to infer from them, zones to be corrected, the applicant has already proposed a solution consisting of extracting the information by calculating, as extracted raw data, a difference image $D(C, L)$ (in fact, the contrast between the background's light level and the light level of the data to be extracted). A threshold value is used for selecting the values to be extracted from this difference image. This threshold value $V_S$ may thereby be selected as a threshold value of the gradient for removing the grid of lines (square pattern). However, this method has the following drawbacks:

If no grid of lines is present in the original image, value $V_S$ corresponds to the threshold for removing noise. It is found that this threshold is difficult to obtain by using a conventional histogram technique which does not provide satisfactory results.

If grid lines are present, the correct threshold for finding a pattern may be determined, but this threshold value cannot always be used as a threshold for extracting a piece of information. Indeed, this threshold value always does not remove either grid lines or noise completely because the non-predictive image contrast varies like a diffuse saturation and like fogged image surfaces due to random illumination conditions.

In the case of color images, three channels (red, green and blue) need to be considered and it is not clearly apparent whether one should have one threshold per channel or one threshold for all the channels.

Moreover, it is known that reading and/or interpretation by a person of a text or graphic reproduced from information delivered by a camera which views an original document, assumes that shooting is performed under or close to normal incidence in order to allow recognition of letters composing the text and interpretation of the graphic (which most often requires observance of the shapes and proportions).

Indeed, when the document is viewed by a camera under any incidence, the produced image has a projective deformation: accordingly, starting from a certain distance from the camera, disappearance of details which are required for character recognition and for consequently understanding the document, is reported.

In order to eliminate these drawbacks, the applicant has already proposed a solution consisting of extracting identifiable contextual data present in the image taken by the camera and correcting the raw or extracted data delivered by the camera by means of these contextual data, the corrected data being then stored in memory and/or transmitted to an addressee so as to be displayed for reading purposes.

The contextual data used for performing the correction of raw data may affect a pattern (a physical, plotted or printed contour) initially existing in the document or reported beforehand, certain parameters of which are known beforehand. The correction process may then comprise the following steps:

searching for this pattern in the raw image taken by the camera, calculating projective deformations exhibited by the raw image, from deformations of the pattern which it contains and which arise through changes in the aforementioned parameters, determining the corrections to be made to the raw data or to the extracted data depending on the projective deformations, generating an image containing the corrected data, while taking into account the corrections determined beforehand.

The pattern searching step is then obtained by a first searching sequence including:

detecting boundaries present in the image, extracting boundaries, the length of which exceeds a predetermined value, and detecting zones delimited by the boundaries found, with a sufficient surface area (larger than a predetermined value) and not touching the edge of the image.

For each area found, this process comprises a calculation step for determining the main axis of the zone, for finding a point external to the zone on said main axis, the construction of an external cone issued from the external point, the extraction of the points from the boundary, the external normal of which is opposed to the vector which joins it and starts from the external point, the calculation of the line borne by the main axis of the extracted points, when the four lines are found, the calculation of four apices of the quadrilateral derived from the four lines and then, when the surface area of the quadrilateral is close to the surface area of the zone, the calculation of the homography deforming the quadrilateral into a rectangle having pre-established proportions.

It is found that one of the drawbacks of this method precisely consists in that it involves proportions set beforehand. Of course, if these proportions set beforehand are not the initial ones, the homographic transformation performed on the image leads to changes in the proportions of the objects contained in the corrected image.

Moreover, it is found that the homographic calculations used hitherto, are particularly complicated. Indeed, for each pixel of the final image, a zone of the initial image needs to be determined, the luminance and chrominance values of which are read in order to subsequently assign them in the final image to the location which this pixel should have according to a homographic relationship.

Now, it is seen that the written text portion in an image generally does not comprise more than 20% of the pixels of this image so that the remaining 80% of the pixels of the image are of no interest.

OBJECT OF THE INVENTION

Accordingly, the object of the invention notably is to solve these problems.

For this purpose, first of all, it provides a method for accurately determining a noise contextual datum used for correcting the extracted raw data, and notably, the threshold value $V_S$ at which the printed or handwritten information may be extracted without being concerned with knowing whether the grid lines are present or not, regardless of the sought-after pattern. Further, this threshold value may be used as a gradient threshold for seeking the pattern in order to reduce the processing requirements to the one and only pattern searching step. If the intention is to extract information for a color image, each color component of the image should be considered for calculating a unique threshold in order to extract color information.

An image having a grey level is then considered, which may consist in a combination of three color channels of the image (red-green-blue) or in one of these channels.

SUMMARY OF THE INVENTION

More specifically, the invention provides a method for extracting raw data from an image resulting from a camera shot, characterized in that it comprises the following steps:

a) determining for each point located by column C and line L of the image, a value $V_S[C, L]$ consisting of a combination of components of the color of the image, expressed as:

$$V_0[C,L] = \alpha \text{Red}[C,L] + \beta \text{Green}[C,L] + \gamma \text{Blue}[C,L]$$

formula wherein $\alpha$, $\beta$, $\gamma$ are coefficients which may for example satisfy the following relationships:

$$\alpha + \beta + \gamma = 1 \text{ and } \alpha, \beta, \gamma \geq 0$$

b) calculating for each point of the image, a background value $V_{Back.}(C, L)$ c) calculating for each point of the image, the difference $D[C, L]$ $$D[C, L] = V_{Back.} - V_0[C,L] \text{ (dark data/bright background)}$$

or $$V_0[C,L] - V_{Back.} \text{ (bright data/dark background)}$$

d) calculating a threshold value $V_S$ consisting of a noise contextual datum used for correcting the extracted raw data, from at least one contrast histogram and/or from the probability q that a regional maximum of the raw data $D[C, L]$ contains noise e) correcting the raw data $D[C, L]$ by means of the noise contextual datum $V_S$ resulting in extracted data $D^*[C, L]$ f) calculating for each point of the image, a corrected value $I^*[C,L]$, taking into account the corrected raw datum $D^*[C, L]$ g) optionally presenting the extracted data or the image containing them under a desired angle.

Advantageously, the background value $V_{Back.}$ may be determined by an operating sequence comprising the following steps:

calculating for each point of the image, a value $V_{N+1}[C, L]$ which is the maximum (dark data on bright background) or minimum (bright data on dark background) value between the value $V_N[C,L]$ and different averages of $V_N$ values over symmetrical structuring items centered on [C,L], iterating said calculation a predetermined number of times (N_final) and then taking into account the values of the final image $V_{N\_final}$ as the values of the background image $V_{Back.}$, the calculation of value $V_{N+1}[C,L]$ may be obtained by a relationship of the type:

$$V_{N+1}[C, L] = \begin{array}{c} \max(\text{dark/bright background}) \\ (\text{or min (bright/dark background)}) \end{array}$$

$$\left\{ V_N[C, L] \frac{V_N[C+1, L+1] + V_N[C-1, L-1]}{2} \right.$$

$$\frac{V_N[C+1, L-1] + V_N[C-1, L+1]}{2}$$

$$\left. \frac{V_N[C, L+1] + V_N[C, L-1]}{2} \frac{V_N[C+1, L] + V_N[C-1, L]}{2} \right\}$$

the background image $V_{Back.}$ may also be determined by an operating sequence comprising the following steps:

generating an image $V_{N+1}$, four times smaller than $V_N$, comprising the calculation for each point of the image, of a value $V_{N+1}[C,L]$ which is the maximum (dark data on bright background) or the minimum (bright data on dark background) between a local average of $V_N$ centered on the point $[2C+½, 2L+½]$ (the four adjacent pixels here) and at least a local average including a larger number of pixels (the 16 adjacent pixels here); image $V_{N+1}$ then being four times smaller than image $V_N$, iterating said calculation, a predetermined number of times $V_{NFinal}$, interpolating values of the image $V_{N\_Final}$ in order to obtain the values of $V_{Back.}$ which has the same size as the initial image $V_0$, the value $V_{N+1}[C,L]$ may be determined by an operating sequence comprising:

$$V_{N+1}[C, L] = \begin{array}{c} \max(\text{dark/bright background}) \\ (\text{or min (bright/dark background)}) \end{array}$$

$$\left\{ \frac{V_N[2C, 2L] + V_N[2C+1, 2L] + V_N[2C, 2L+1] + V_N[2C+1, 2L+1]}{4}, \right.$$

$$(V_N[2C-1, 2L-1] + V_N[2C-1, 2L] + V_N[2C-1, 2L+1] +$$

$$V_N[2C-1, 2L+2] + V_N[2C, 2L-1] + V_N[2C, 2L] + V_N[2C, 2L+1] +$$

$$V_N[2C, 2L+2] + V_N[2C+1, 2L-1] + V_N[2C+1, 2L] +$$

$$V_N[2C+1, 2L+1] + V_N[2C+1, 2L+2] + V_N[2C+2, 2L-1] +$$

$$\left. V_N[2C+2, 2L] + V_N[2C+2, 2L+1] + V_N[2C+2, 2L+2])/16 \right\}$$

The raw data D[C,L] are generally affected by a perspective deformation due to the arbitrary position of the camera in front of the supporting medium. The perspective deformation of the extracted raw data may be corrected with a known method for extracting geometrical contextual data. Likewise, these extracted raw data are also affected by luminous and/or electronic noise which may be eliminated by thresholding as follows:

After having calculated the noise contextual datum $V_S$, for each point of the image, a comparison of value D[C,L] with threshold value $V_S$ is made in order to determine the value D*[C,L] to be extracted in the following way:

if D[C,L]<$V_S$ then D*[C,L]=0
if D[C,L]≧$V_S$, value D[C,L] is retained, i.e. D*[C,L]=D[C,L] or else it is replaced with
D[C,L]−$V_S$ i.e. D*[C,L]=D[C,L]−$V_S$ Generation of image I*(p) containing the extracted data according to the subtractive principle, results from the calculation I*(p)=$I_{max}$−f.D*(p) (dark data/bright background), with $I_{max}$, value of the bright background, which may be equal to 255 for example, or I*(p)=$I_{min}$+f.D*(p) (bright data/dark background), $I_{min}$ may be equal to zero.

The threshold value $V_S$ is a noise contextual datum used for correcting raw data D[C,L]. It may be calculated according to a method based on the probability q that any regional maximum of raw data contains noise. This method comprises the following operating phases:

a first phase wherein for each pixel p of a grey image I (either a color channel or luminance) the following is performed:
a) for each direction d, with 0<|d|<D
if the following condition is satisfied:
convexity of I on [p−d, p+d], i.e., $I(p+(1-2\lambda)d) \leq \lambda I(p-d)+(1-\lambda)I(p+d)$ for any $0 \leq \lambda \leq 1$
in case of dark data bright background)

or
concavity of I on [p−d, p+d], i.e., $I(p+(1-2\lambda)d) \geq \lambda I(p-d)+(1-\lambda)I(p+d)$ for any $0 \leq \lambda \leq 1$
(bright data/dark background)

then $G(p,d)=(I(p+d)+I(p-d))/2$ is calculated or else $G(p,d)=0$ b) a value S(p) is calculated, which is equal to the maximum value of G(p,d) for all directions d with 0<|d|<D
as an alternative to this calculation of S(p), S(p) may be replaced with D(p), D(p) corresponding to the raw data,
a second step wherein a value $S_{max}$ is calculated, which is equal to the maximum value of S(p), for all pixels p
a third step wherein a histogram H(s) is reset to 0 for all values of s between 0 and $S_{max}$
a fourth step for calculating the contrast histogram for the regional maximum pixels containing the noise to be eliminated, wherein this calculation may comprise:
a step wherein for each pixel p in the image S(p), if S(p) is a regional maximum, H(S(p)) is incremented according to the relationship H(S(p))←H(S(p))+1
a step wherein the identities S=$S_{max}$ and N=1/q are determined and as long as H(S) is less than N, S is replaced with S−1, the final value of S is called $S_{min}$, N is the minimum number of regional maximum pixels such that the mathematical expected value of the number of pixels containing noise is larger than or equal to 1 a step wherein value $V_S$ is calculated according to formula $V_S = r.S_{min}+(1-r).S_{max}$, with $\frac{1}{2} \leq r \leq 1$ The threshold value $V_S$ may also be calculated according to the following method:

1) A first step for calculating a histogram of the pits, H_pits, including the following operating phases:
a) for each pixel p of image I, the following is performed:
i. for each direction d with 0<|d|<D:
if the following condition is satisfied:
convexity of I on [p−d, p+d]

$I(p+(1-2\lambda)d) \leq \lambda I(p-d)+(1-\lambda)I(p+d)$ for any $0 \leq \lambda \leq 1$ then $G(p,d)=(I(p+d)+I(p-d))/2$ is calculated or else $G(p,d)=0$ ii. S(p)=maximum value of G(p,d), is calculated for all the directions d with 0<|d|<D
as an alternative to this calculation of S(p), S(p) may be replaced with a value D(p) which corresponds to the raw data (dark data/bright background)
b) the maximum value of the pits, S_pits_max is calculated, which is equal to the maximum value of S(p) for all pixels p
c) the pit histogram, H_pits, is reset to zero for each value of s between 0 and the maximum value of the pits, S_pit_max
d) for each pixel p of the image S(p) the following calculations are performed:
i. if S(p) is a regional maximum, H_pits (S(p)) is incremented in the following way:

H_pits (S(p))←H_pits (S(p))+1

2) A second step for calculating the histogram of the bumps, H_bumps, includes the following operating phases:
a) for each pixel p of image I, the following is performed:
i. for each direction d with 0<|d|<D:
if the following condition is satisfied:
concavity of I on [p−d, p+d], i.e., $I(p+(1-2\lambda)d) \geq \lambda I(p-d)+(1-\lambda)I(p+d)$ for any $0 \leq \lambda \leq 1$
(bright data/dark background) are satisfied then $G(p,d)=(I(p+d)+I(p-d))/2$ is calculated or else $G(p,d)=0$ ii. S(p)=maximum value of G(p,d) is calculated for all the directions d with 0<|d|<D
as before, as an alternative to this calculation of S(p), the value S(p) may be replaced with a value D(p) which corresponds to the raw data (bright data/dark background)
b) the maximum value of the bumps, S_bumps_max, is calculated, which is equal to the maximum value of S(p) for all pixels p
c) the bump histogram H_bumps(s) is reset to 0 for each s between 0 and the maximum value of the bumps, S_bumps_max
d) for each pixel p of the image S(p), the following calculations are performed:
i. if S(p) is a regional maximum
H_bumps(S(p)) is incremented in the following way:

H_bumps (S(p))←H_bumps (S(p))+1

3) A third step for superimposing pit histogram H_pits and bump histogram H_bumps, includes the following phases:

a) S_max is calculated according to the expression:

S_max=Max(maximum value of the pits, S_pits_max, maximum value of the bumps, S_bumps_max)

b) H_max is calculated according to the expression:

H_max=maximum value of the pits H_pits(S) and the bumps H_bumps(S) for all values of S c) S0 is calculated according to the expression:

s0=maximum value of s such that H_pits(s)=H_max or H_bumps(s)=H_max d) s=s0+1 is calculated and α is selected such that 0<α<½ and as long as:

|ln(1+H_pits(s))−ln(1+H_bumps(s))|<α.ln(1+H_max)

s←s+1 is performed (wherein ln is Napier's logarithm function)

finally, value $S_{min}$ is determined by the final value of s incremented by 1

4) a step for calculating the extraction threshold $V_S$ according to the relationship:

$V_S = r.S_{min} + (1−r).S_{max}$ where ½<r<1

It is seen that step b) of the method for extracting raw data, is iterated a large number of times, so that the threshold values calculated by means of both methods described earlier via calculation of S(p) do not allow the extracted raw data to be corrected efficiently.

This drawback may be suppressed by using the alternative consisting of replacing S(p) with D(p).

Thus, in this case, when the probability q that any regional maximum of the raw data contains noise, is known, the process for extracting the noise contextual datum may comprise the following steps:
  a first step wherein a value $S_{max}$ is calculated, which is equal to the maximum value of D(p) for all the pixels p=[C,L], D being the image of the raw data to be corrected
  a second step wherein a histogram is reset H(S)=0 for all values of S between 0 and $S_{max}$
  a third step wherein for each pixel p in image D(p), if D(p) is a regional maximum, H(D(p)) is incremented according to the relationship H(D(p))←H(D(p))+1 a fourth step wherein the identities S=$S_{max}$ and N=1/q are determined and as long as H(S) is less than N, S is replaced with S−1, the final value of S is called $S_{min}$
  a fifth step wherein the value of the noise contextual datum $V_S$ is calculated according to formula $V_S = r.S_{min} + (1−r).S_{max}$ with ½≤r≤1

If the probability q that any regional maximum of the raw data contains noise, is not known, the process for extracting the noise contextual datum $V_S$ may comprise the following steps:
1) a first step for calculating a pit histogram, H_pits includes the following operating phases:
  a) the maximum values of the pits S_pits_max is calculated, which is equal to the maximum value of D(p) for all the pixels p, D being the image of the extracted dark-on-bright-background raw data
  b) the pit histogram H_pits is reset to 0 for each value of s between 0 and the maximum value of the pits, S_pits_max
  c) for each pixel p of image D(p),
    if D(p) is a regional maximum H_pits (D(p)) is incremented in the following way:

H_pits (D(p))←H_pits (D(p))+1

2) A second step for calculating a bump histogram, H_bumps includes the following operating phases:
  a) the maximum value of the pits $S\_bumps_{max}$ is calculated, which is equal to the maximum value of D(p) for all pixels p, D being the image of the extracted bright-on-dark-background raw data
  b) the pit histogram H_bumps is reset to 0 for each value of s between 0 and the maximum value of the pits, S_bumps_max
  c) for each pixel p of the image D(p),
    if D(p) is a regional maximum H_bumps (D(p)) is incremented in the following way:

H_bumps (D(p))←H_bumps(D(p))+1

3) A third step for superimposing pit H_pits and bump H_bumps histograms includes the following operating steps:
  a) calculating S_max according to the expression:

$S_{max}$=Max (maximum value of the pits S_pits_max, maximum value of the bumps S_bumps_max)

b) calculating H_max according to the expression:

H_max=maximum value of the pits H_pits(S) and of the bumps, H_bump(S) for all values of S c) calculating s0 according to the expression:

S0=maximum value of s such that

H_pits(s)=H_max or H_bumps(s)=H_max d) s=s0+1 is calculated and α is selected such that 0<α<½ and as long as:

|ln(1+H_pits(s))−ln(1+H_bumps(s))|<α.ln(1+H_max)

s←s+1 is performed (where ln is Napier's logarithm function) finally the value $S_{min}$ is determined by the final value of s incremented by 1

4) a step for calculating the value of the noise contextual datum $V_S$ according to the relationship:

$V_S = r.S_{min} + (1−r).S_{max}$ where ½<r≤1

Of course, information from a color image with red, green, blue color channels needs to be extracted. The steps of the method described earlier may be followed for each color channel, by determining a threshold for each channel. Extraction of the color information from the red, green, blue channels and their recombination into a final color image may be performed by extracting the red, green, blue values in each pixel for which it is seen that the threshold has been exceeded.

Moreover, with the purpose of eliminating the drawbacks of the searching methods for patterns (physical, plotted, or printed contours), expressing some contextual data and involving proportions set beforehand, the invention proposes determining the real height/width ratio of the quadrilateral formed by four identified points of a pattern present in the image of a contour which is used for determining some contextual data of the image and this, in order to be able to reconstruct a document having the same proportions.

For this purpose, the applicant provides a method for presenting information extracted from an image of the aforementioned type along a desired view angle, from a picture taken by a camera under any incidence, this method comprising:
  searching for at least four identifiable characteristic points of a pattern present in the image taken by the camera, defining contextual data, optional extraction of the data according to predetermined criteria, calculating geometrical deformations to be made on the raw image, the information or the extracted data, from the relative position of four points with respect to relative reference positions, determining corrections to be made to the raw image or to the extracted data depending on the geometrical deformations, generating an image containing the extracted data, taking into account the thereby determined geometrical corrections.

This method is characterized in that, for obtaining an image containing extracted data having the same proportions as the object, it comprises the determination of the real height/width ratio of the quadrilateral defined by the aforementioned points and the taking into account of this ratio r in generating the corrected image.

More specifically, determination of the proportions of the quadrilateral (rectangle) is carried out according to a process comprising the following steps:

searching for four identifiable characteristic points of a pattern present in the image, determining the vanishing points from the sides of the quadrilateral defined by the four points and determining a horizon line connecting the vanishing points, determining the coordinates of the projection point F of the optical centre O of the camera on the horizon line, calculating the camera base point (orthogonal projection of the optical centre of the camera on the plane of the pattern) from distances between the vanishing points and the projection point F and from the distance between this projection point F and the optical centre O, calculating the focal length from the distances between the optical centre, the projection point F and the camera base point, calculating the coordinates of the intersection points $M_1$ $N_1$, $M_2$ $N_2$, between the vanishing lines and the lines connecting the camera base point and the vanishing points as well as points $O_1$, $O_2$, $P_1$, $P_2$, located on the vanishing lines, at conventional (elliptical) distances from the camera base point, calculating the ratio of the sides of the initial pattern from the coordinates calculated earlier by considering that the rectangle $O_1$, $O_2$, $P_1$, $P_2$, is the projection of a square extending in the plane of the pattern.

If only the vanishing lines of a same pair intersect at a vanishing point while both other vanishing lines are parallel (vanishing point projected to infinity), calculation of the r ratio will be carried out by starting with a pre-established focal length f of the camera.

If all the vanishing points are projected to infinity, ratio r is equal to the ratio of the lengths of the adjacent sides of the quadrilateral.

An important advantage of this method consists in that it is not very sensitive to lack of orthogonality of the adjacent sides of the quadrilateral which is frequently the case when the quadrilateral is a pattern plotted by hand. Indeed, conventional solutions are particularly sensitive to such defects (instability in the case of lack of orthogonality).

Another advantage of this solution consists in that texts may be reproduced in which there is no alignment of characters.

With the purpose of alleviating homographic calculations notably by avoiding unnecessary calculations and by only applying them to the pixels which are relevant to the written text in the image and by reusing as much as possible calculations which have already been performed, the applicant proposes an operating sequence including the following phases:

creating an initial (deformed) binary mask of the zones to be corrected by isolating the useful portion of the initial image containing the extracted data and by assigning the same binary value (0 or 1) to the pixels of this useful portion, calculating an ideal binary mask by a direct homographic transformation of the initial mask (based on the transformation of any polygonal shape into a reference polygonal shape), for each pixel (u, v) of the useful portion of the ideal binary mask, calculating by inverse homography, the position (x, y) in the initial image, determining the value of the final image at pixel (u, v) by an interpolated value at (x, y) in the initial image.

Advantageously, the calculation of the inverse homography may comprise a preliminary calculation by inverse homography of the lines and columns of each pixel of the ideal mask. It will then be possible to infer the position of a given pixel in the initial image by calculating the intersection of both lines.

BRIEF DESCRIPTION OF THE DRAWINGS

Embodiments of the invention will be described hereafter, as non-limiting examples, with reference to the appended drawings wherein.

DESCRIPTION OF THE PREFERRED EMBODIMENTS

Figure 1:
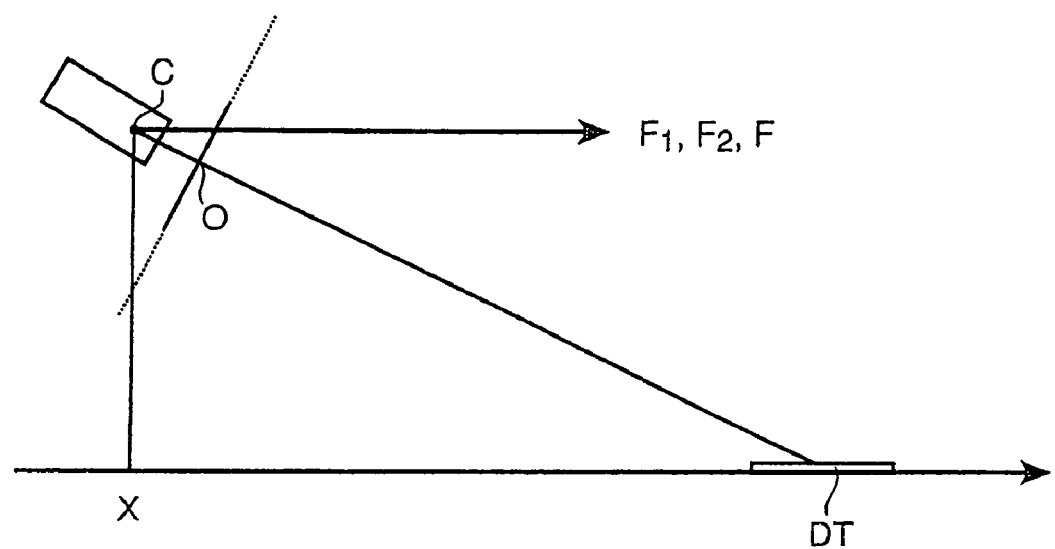
FIG. 1 is a schematic illustration of the shooting of a document by a camera, the main parameters used in the method according to the invention may be shown with this illustration.

In the example illustrated in FIG. 1, the original document which is intended to be shot with a camera is positioned on a planar supporting medium, horizontally.

The camera is positioned above the plane of the supporting medium and therefore of the document, at a determined height, the axis of the camera which is orientated towards the document being oblique (here, an angle of incidence of about 30°).

The image of the document taken by the camera is located in an image plane which extends perpendicularly to the optical axis of the camera.

The orthogonal projection of the optical centre C of the camera in the plane of the supporting medium is called the base of the camera.

The plane passing through point C which is parallel to the plane of the supporting medium is the apparent horizon of the supporting medium.

The pattern of a rectangle of document DT provides at the image, a quadrilateral A,B,C,D (FIG. 2), the segments DC and AB of which are borne by two lines (vanishing lines) which intersect at a point $F_1$ while segments DA and CB are borne by two lines (vanishing lines) which intersect at a point $F_2$. The line bearing the segment $F_1F_2$ is the horizon line.

Figure 2:
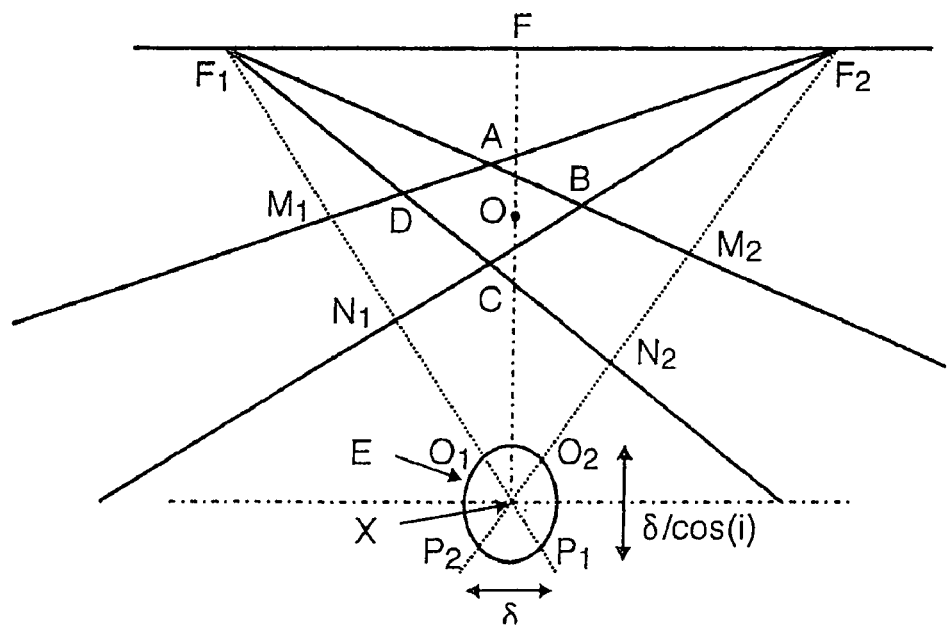
FIG. 2 is a projection of the view illustrated in FIG. 1 in the plane of the image of the document.

As illustrated in FIG. 2:

| | |
|---|---|
| X | is the base of the camera (projection of the optical centre C in the plane of the document) |
| $M_1$ | is the intersection of lines (AD) and $(F_1X)$ |
| $N_1$ | is the intersection of lines (BC) and $(F_1X)$ |
| $M_2$ | is the intersection of lines (AB) and $(F_2X)$ |
| $N_2$ | is the intersection of lines (CD) and $(F_2X)$ |
| δ | is a positive constant representative of a conventional distance measured from point X on axes $(F_1, X)$ and $(F_2, X)$ |
| i | is the angle of incidence |
| E | is an ellipse with a major axis parallel to (FX); its major axis has a length δ/cos(i) and its minor axis has a length δ |
| O1 and $P_1$ | are the intersections of $(F_1, X)$ with ellipse E |
| O2 and $P_2$ | are the intersections of $(F_2, X)$ with ellipse E |
| O | is the centre of the image |
| F | is the orthogonal projection of the optical centre O of the camera on line $(F_1, F_2)$ |

In accordance with the method according to the invention, calculation of the physical aspect ratio r (r=horizontal length/vertical length) of the rectangle forming the original pattern is achieved according to one of the following three operating sequences:

1) The case when points $F_1$ and $F_2$ exist, segments AB, BC, CD, DA not being parallel. In this case, the operating sequence comprises the following phases:
  a first phase for calculating the coordinates of point F by projecting the centre of the image O on the horizon line $(F_1, F_2)$
  a second phase for calculating the position of the base of the camera by its distance to point F, dist(X,F) by means of the relationship:

$$dist(X, F) = \frac{dist(F, F_1) \cdot dist(F, F_2)}{dist(O, F)}$$

This results from the following demonstration in three steps:

a) the angle between the base of the camera and horizon is 90° and it is inferred that i. $\tan(i) = \frac{OX}{f}$ and $\tan(\frac{\pi}{2} - i) = \frac{OF}{f}$ ii. therefore $\frac{XF}{OF} = 1 + \frac{OX}{OF} = \frac{1}{\cos^2(i)}$ b) the angle between $F_1$ and $F_2$ is also 90° and it is inferred that i. $\tan(j) = \frac{FF_1}{g}$ and $\tan(\frac{\pi}{2} - j) = \frac{FF_2}{g}$ with g=OF/cos(i) and j being the angle between $F_1$ and $F_2$ from this, we obtain ii. therefore $\frac{1}{\cos^2(i)} = \frac{FF_1 \cdot FF_2}{OF^2}$ c) the final formula for XF is obtained by combining relationships a) ii. and b) ii.,
  a third phase for calculating the focal length f with the relationship:

$$f = \sqrt{dist(O,X) \cdot dist(O,F)}$$

(inferred from a) i. above)
  a fourth phase for calculating the angle of incidence i expressed by:

$$\tan(i) = \sqrt{\frac{dist(O, X)}{dist(O, F)}}$$ (inferred from a) i. above)

a fifth phase for determining the coordinates of points $M_1, N_1, O_1$ and $P_1$ from the values calculated earlier
a sixth phase for determining the coordinates of points $M_2, N_2, O_2$ and $P_2$ from the values calculated earlier
a seventh phase for calculating the physical aspect ratio r by using the crossed ratios and the fact that the rectangle $O_1, O_2, P_1, P_2$ is the projection of a square extending in the plane of the pattern centred on the base according to the relationship $$r = \frac{dist(M_1, N_1)}{dist(M_2, N_2)} \cdot \frac{dist(F_1, O_1)}{dist(F_1, M_1)} \cdot \frac{dist(F_1, P_1)}{dist(F_1, N_1)} \cdot \frac{dist(F_2, M_2)}{dist(F_2, O_2)} \cdot \frac{dist(F_2, N_2)}{dist(F_2, P_2)}$$

This results from the fact that [O1,P1] and [O2,P2] are projections of two segments of the same length: [O1,P1] and [O2,P2] may be used as segments and the relative lengths of segments [M1,N1] and [M2,N2] may be measured by using the crossed ratios and r may be inferred from them.

2) The case when two of the segments are parallel (intersection point is projected to infinity) (FIG. 3))
In this case, ratio r is obtained according to the following relationship:

$$r = \frac{dist(A, B) \cdot dist(C, D)}{(dist(C, D) - dist(A, B)) \cdot \sqrt{f^2 + dist(O, F_2)^2}}$$

formula wherein f is the focal length of the camera (with the understanding that this focal length f is calculated beforehand).

3) The case when there is no vanishing point (segments AB, BC, CD, DA being parallel, two by two)
In this case, the ratio r is simply $$r = \frac{dist(A, B)}{dist(A, D)}$$

Figure 5:
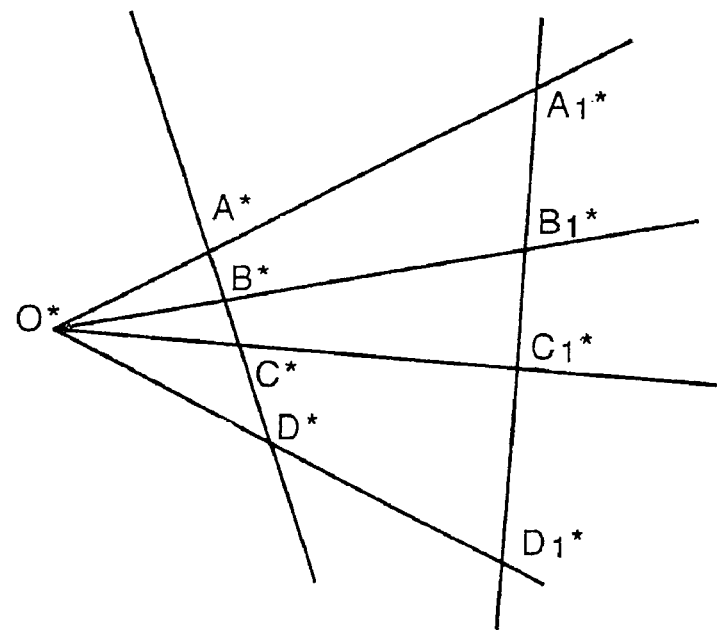
FIG. 5 illustrates a projective geometrical invariant.

These relationships are essentially based on invariants in projective geometry and in particular on the crossed ratios of four points, the relationships of which are expressed facing FIG. 5 which shows two views $A^*B^*C^*D^*$-$A^*_1B^*_1C^*_1D^*_1$ of a same object taken by a camera with optical centre $O^*$ with two different angles of incidence.

From points $A^*, B^*, C^*$, and $D^*$, a first series of crossed ratios $$\frac{A^*B^*}{A^*D^*} \div \frac{CB^*}{CD^*}.$$

may be obtained.

Likewise, from points $A^*_1$, $B^*_1$, $C^*_1$, $D^*_1$ a second series of crossed ratios $$\frac{A_1^*B_1^*}{A_1^*D_1^*} \div \frac{C_1^*B_1^*}{C_1^*D_1^*}$$

is obtained.

Conservation of the crossed ratio is then expressed as $$\frac{A^*B^*}{A^*D^*} \div \frac{CB^*}{CD^*} = \frac{A_1^*B_1^*}{A_1^*D_1^*} \div \frac{C_1^*B_1^*}{C_1^*D_1^*}$$

In the case when one of the points, for example point A, is projected to infinity, the ratio $A^*B^*/A^*D^*$ is considered to be equal to 1.

As mentioned earlier, the invention also provides a method for reshaping the image allowing the complexity of the homographic calculations to be reduced, calculations which were hitherto used notably when this image contains text.

Figure 6:
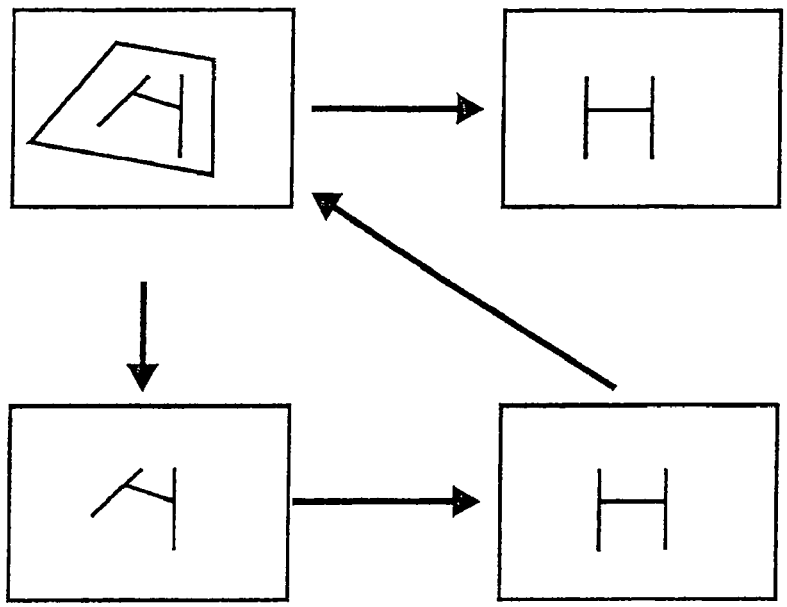
FIG. 6 is a schematic illustration of the operating steps for an image processing process according to the invention in order to obtain a corrected image.

FIG. 6 illustrates the different steps of this re-shaping mode which comprises:

a) a first step for calculating a binary mask deformed from an image where the frame (or the page) has been detected, and the text (written) portion has been extracted. This step consists of affecting a zero value to all the pixels which are outside a quadrilateral surrounding the useful portion of the image as well as the pixels which do not correspond to the writing.

Figure 4:
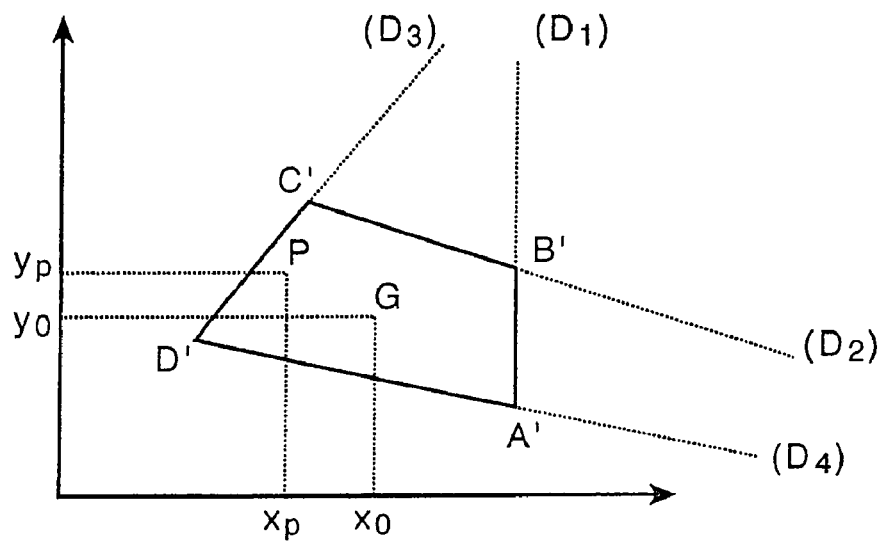
FIG. 4 is a diagram relating to the characterization of the inside of a quadrilateral.

The position of a point inside or outside a quadrilateral may be determined according to the method illustrated in FIG. 4.

This figure shows in an x,y coordinate reference plane, a quadrilateral A', B', C', D', as well as, inside this quadrilateral, two points P and G of coordinates xp, yp and xo, yo. The G point may consist of the centre of gravity of the quadrilateral A', B', C', D' or more simply of the centre of its diagonals, for example the centre of segment B'D'.

Segments A'B'-B'C'-C'D' and D'A' are borne by lines $D_1$, $D_2$, $D_3$, $D_4$, respectively.

The expression of these lines and more generally of a line Di with i=1,2,3,4 is of the type:

$ai.x+bi.y+ci=0$ ai, bi, ci being constants.

Point P is therefore inside the quadrilateral if and only if, it is always on the same side as G relatively to the limits of the quadrilateral (each limiting line $D_1$-$D_4$ dividing the plane into two portions): this amounts to stating that:

ai.xp+bi.yp+ci and ai.xo+bi.yo+co have the same sign for i belonging to the set {1,2,3,4}. This is written in the following form:

$\forall i \in \{1,2,3,4\}$ $(ai.xp+bi.yp+ci).(ai.xo+bi.xo+ci) \geq 0$ b) A second step for calculating the ideal mask by direct homography.

Figure 7:
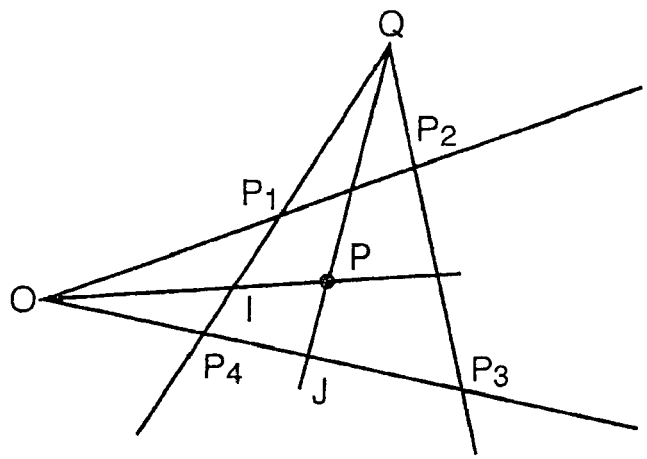
FIGS. 7-11 are diagrams for illustrating the calculations performed according to the process illustrated in FIG. 6.

Reference will be made here to FIG. 7 which illustrates the principle for calculating the image of a point by homography. On this figure, a quadrilateral $P_1$, $P_2$, $P_3$, $P_4$ determined by using the method described earlier (page) and a point of coordinates (u,v) located inside this quadrilateral, are illustrated.

Point O, if it exists, is the intersection of lines ($P_1$, $P_2$) and ($P_3$, $P_4$). Point Q is the intersection of lines ($P_1$, $P_4$) and ($P_2$, $P_3$). Point I is the intersection of segments OP and $P_1P_4$, whereas J is the intersection of segments QP and $P_3P_4$.

Figure 8:
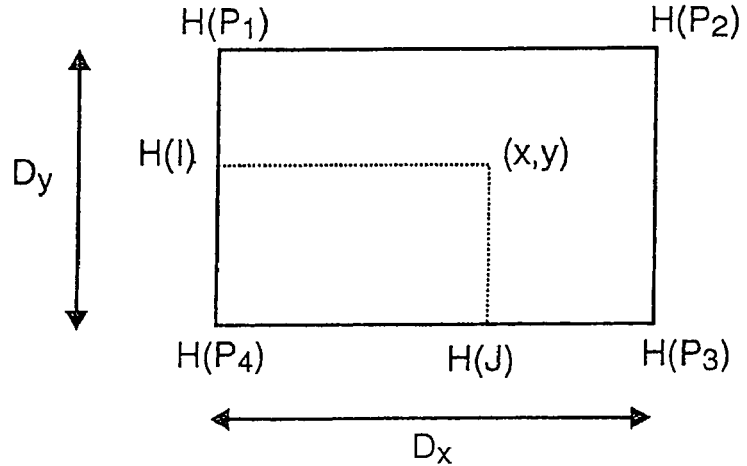

It is known that homography provides the transformation of a quadrilateral (here, $P_1$-$P_4$) into a rectangle $H(P_1)$, $H(P_2)$, $H(P_3)$, $H(P_4)$ visible in FIG. 8.

In this FIG. 8, a point (x,y) with coordinates H(I), H(J) is also illustrated and the length $D_x$ and the width $D_y$ of the rectangle are shown.

Conservation of the crossed ratios then gives:

$$\frac{OP_4}{OP_3} \cdot \frac{JP_3}{JP_4} = \frac{Dx-1-x}{x}$$

$$\frac{QP_4}{QP_1} \cdot \frac{IP_1}{IP_4} = \frac{Dy-1-y}{y}$$

The coordinates of H(P) may be inferred therefrom $$x = \frac{(Dx-1) \cdot OP_3 \cdot JP_4}{OP_3 \cdot JP_4 + OP_4 \cdot JP_3}$$

$$y = \frac{(Dy-1) \cdot QP_1 \cdot IP_4}{QP_1 \cdot IP_4 + QP_4 \cdot IP_1}$$

The calculation of the image of a line by homography obviously results from this calculation as the image of a line simply consists of the segment joining the images of both points of the original line.

Figure 9:
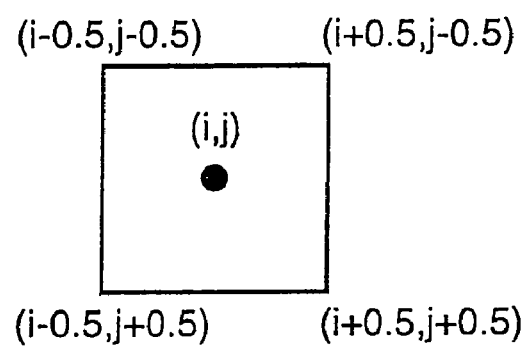

The calculation of the ideal mask is performed according to the following process:

Let (i,j) be a pixel which corresponds to the writing in the deformed binary mask with its four subpixels which surround it (FIG. 9):

$$\left(i-\tfrac{1}{2}, j-\tfrac{1}{2}\right), \left(i-\tfrac{1}{2}, j+\tfrac{1}{2}\right),$$
$$\left(i+\tfrac{1}{2}, j+\tfrac{1}{2}\right)\left(i+\tfrac{1}{2}, j-\tfrac{1}{2}\right)$$

Figure 10:
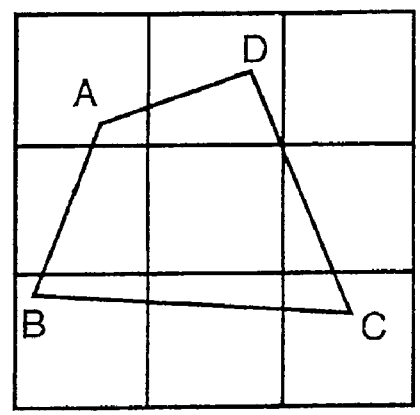

Let us assume that A, B, C and D are the images of these subpixels by direct homography (FIG. 10). A, B, C, D is therefore a quadrilateral. Let us consider the smallest rectangle which this quadrilateral contains. All the pixels contained in this rectangle are set to the "true" value for example 1.

An ideal binary mask may be obtained from this. A mechanism should then be established for calculating the image of a point with coordinates in the form of $(u\pm\tfrac{1}{2}, v\pm\tfrac{1}{2})$ wherein u, v is a pixel.

For this purpose, a point P of the coordinate plane $(u\pm\tfrac{1}{2}, v\pm\tfrac{1}{2})$ is considered. This point is determined by the intersection of two intermediate lines: the vertical line of coordinate $u\pm\tfrac{1}{2}$ and the horizontal line of coordinate $v\pm\tfrac{1}{2}$. The image of point P is then at the intersection of the images of the horizontal and vertical lines obtained by homography.

Accordingly, the images of these intermediate lines (and intermediate columns) are calculated beforehand. As soon as these images have been precalculated, the images of the sub-pixels are obtained by the intersection of two precalculated images of intermediate lines.

c) A third inverse homography step.

In order to calculate the final image, to each pixel of the binary mask, an intensity value must be assigned, which is calculated by finding the position of this pixel in the initial image: for this purpose, an inverse homography calculation needs to be performed.

Thus, by repeating the symbology of FIGS. 7 and 8, (x,y) is considered to be a pixel of the ideal mask. This pixel is at the intersection of line y and of column x. The position of this pixel in the deformed image is then obtained by obtaining the intersection of the images of the line and column by inverse homography.

The parameters of lines (QJ) and (OI) should then be found in order to calculate their intersection P. The position of points I and J should then be calculated. This result is easily obtained by finding distances $JP_3$ and $IP_1$, for example.

This is possible by using the following form of crossed ratios:

$$\frac{OP_4}{OP_3} \cdot \frac{JP_3}{P_3 P_4 JP_3} = \frac{Dx - 1 - x}{x}$$

$$\frac{QP_4}{QP_1} \cdot \frac{IP_1}{P_1 P_4 IP_1} = \frac{Dy - 1 - y}{y}$$

$$IP_1 = \frac{P_1 P_4 \cdot (Dy - 1 - y) \cdot QP_1}{(Dy - 1 - y) \cdot QP_1 + y \cdot QP_4}$$

It then becomes possible to calculate the position of point P.

Practically, the images are calculated beforehand by inverse homography of the lines and columns of the ideal mask. The position of a given pixel is then inferred in the original image by calculating the intersection of two lines (in this example, the two lines avec (OI) and (QJ)).

Of course, the invention is not limited to this single method.

d) A fourth step for creating the final image:

Let (u,v) be a pixel of the ideal mask. Its position in the deformed initial image is calculated by the intersection of precalculated inverse images of line v and column u. The point which is found, is then called (x,y). An intensity value should then be assigned to pixel (u,v) which will be interpolated in point (x,y) of the initial image. To accomplish this operation, bilinear interpolation is used, for example.

Figure 11:
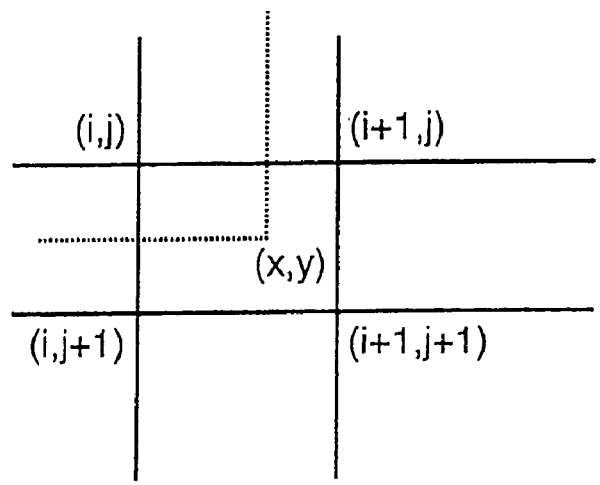

If the pixels surrounding point (x,y) such as illustrated in FIG. 11, are considered, the interpolated intensity is given by formula:

$I(x,y)=(y-j)[(i+1-x)I(i,j+1)+(x-i)I(i+1,j+1)]+(j+1-y)$
$[(i+1-x)I(I,j)+I(I+1,j)]$

Pixel (u,v) in the final image will then have intensity I(x,y) with the understanding that the grey levels are quantified in the final image.

Advantageously, the image containing the corrected extracted data from the noise may be calculated according to the subtractive principle.

It is known that luminance is equal to a combination of the intensities of the fundamental colours (red, green, blue): for example L=0.5G+0.3R+0.2B.

Thus, in accordance with the method according to the invention, for each of the pixels, one successively proceeds with extracting the luminance, extracting the raw data D(p), calculating the noise contextual datum $V_S$, extracting the noise corrected raw data D*(p) by means of the noise contextual datum, and then generating the luminance image corrected by the following calculation:

$$I^*(p) = \begin{cases} I_{max} - f \cdot D^*(p)(\text{dark data/bright})(I_{max} \text{ may be equal to 255}) \\ I_{min} + f \cdot D^*(p)(\text{bright data/dark})(I_{min} \text{ may be equal to zero}) \end{cases}$$

Advantageously, in the case of a colour image, the subtractive principle may be used by removing contrasts of determined chrominances from the background colour, as with a filter, in order to obtain the sought-after colour for the final image.

For example, the noise contextual datum $V_S$ may be extracted on the basis of the luminance image, and then the corrected raw data may be extracted from the noise ($D^*_R$, $D^*_G, D^*_B$) of the colour channels by calculating the raw data of channels $D_R$, $D_G$, $D_B$, expressing the contrast between the observed chrominance RGB and that of the background ($V_R^{Back.}$, $V_G^{Back.}$, $V_B^{Back.}$) and thresholding by means of $V_S$, and finally generating the corrected chrominance image.

$$R^* G^* B^* = \begin{cases} (V_R^{Back.}, V_G^{Back.}, V_B^{Back.}) - f \cdot (D_R^*, D_G^*, D_B^*)(\text{dark data/bright}) \\ ((V_R^{Back.}, V_G^{Back.}, V_B^{Back.}) \text{ may be equal to } (255, 255, 255)) \\ (V_R^{Back.}, V_G^{Back.}, V_B^{Back.}) + f \cdot (D_R^*, D_G^*, D_B^*)(\text{bright data/dark}) \\ ((V_R^{Back.}, V_G^{Back.}, V_B^{Back.}) \text{ may be equal to } (0, 0, 0)) \end{cases}$$

As an example, let us assume that at a pixel, the estimated chrominance of the background corresponding to a white area of the supporting medium is ($V_R^{Back.}$, $V_G^{Back.}$, $V_B^{Back.}$)=(160, 140, 110), and that this pixel represents a blue writing area with chrominance ($V_R^0, V_G^0, V_B^0$)=(120, 115, 105). Let us assume that the corrected white/blue contrast of the optical noise is ($D^*_R, D^*_G, D^*_B$)=(160−120, 140−115, 110−105)=(40, 25, 5). Let us set the chrominance of the pixels of the final image representing the white areas of the supporting medium to ($R_B, G_B, B_B$)=(255, 255, 255), the corrected chrominance of this pixel in the final image is then determined by subtracting the contrast weighted earlier by an f factor, from that of the white, so that the corrected chrominance (R*,G*,B*) of the final image in this pixel will be, if f=1, (R*,G*,B*)=($R_B$−$D^*_R$,$G_B$−$D^*_G$,$B_B$−$D^*_B$)=(255−40, 255−25,255−5)=(215, 230, 250).

The f factor mentioned earlier may be advantageously used for aligning the obtained colours with reference colours, displayed for example on a test pattern.

Of course, the invention is not limited to the embodiments described earlier.

Thus, it is notably found that the usual process for determining the threshold value $V_S$ at which a handwritten or printed piece of information may be extracted from each pixel of the difference image D(p) (based on knowing beforehand the probability q that a regional maximum of raw data D(p) is generated by noise), has the two following drawbacks:

First of all, probability q must be known experimentally for each camera module in order to perform extraction of information from their images. This prevents any extracted information derived from an image captured by an unknown camera module, from being considered as trustworthy information (for example, extraction of information from an image received on a server, for forwarding it by fax to an addressee).

Next, it is mandatory to know beforehand whether the information is dark-on-bright-background information or vice versa.

The invention therefore provides an enhancement of this method with which the two drawbacks mentioned earlier may be avoided. This enhancement notably provides accurate determination of the threshold value $V_S$, at which the printed or handwritten information may be extracted from the difference image D(p) (analogous to D[C,L]) and determination whether the information is dark on a bright background or vice versa, bright on a dark background.

Figure 12:
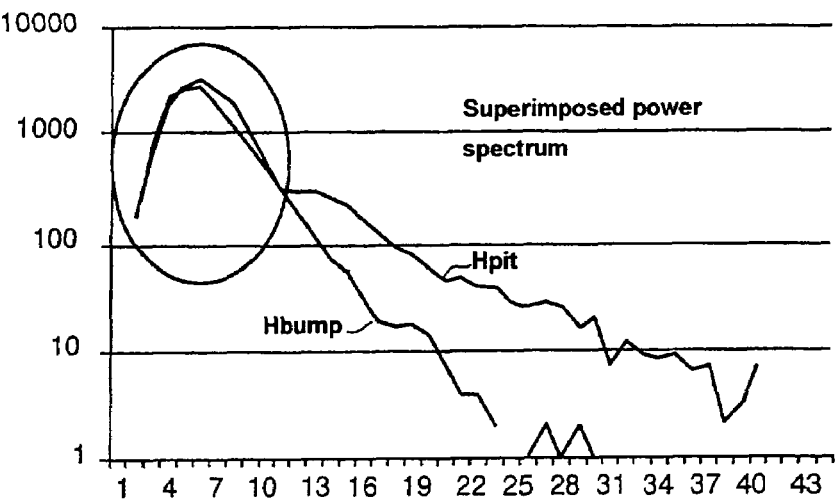
FIG. 12 shows an example of a pair of histograms, H_pits and H_bumps in a logarithmic coordinate reference system.

By considering a grey level image I(p) which may either be a combination of the three colour channels of the image (red, blue, green) or one of these three channels, the method according to the invention comprises the following steps, with reference to FIG. 12:

1) A first step for calculating a pit histogram H_pits includes the following operating phases:
  a) for each pixel p of image I, the following is performed:
    i. for each direction d with 0<|d|<D: if the condition convexity of I on [p−d, p+d] i.e.

$I(p+(1-2\lambda)d) \leq \lambda I(p-d)+(1-\lambda)I(p+d)$ for any $0 \leq \lambda \leq 1$ is satisfied then $G(p,d)=(I(p+d)+I(p-d))/2$ is calculated or else $G(p,d)=0$ ii. S(p)=maximum value of G(p,d) is calculated for all directions d with 0<|d|<D
  b) the maximum value of the pits, S_pits_max is calculated, which is equal to the maximum value of S(p) for all the pixels p
  c) the pit histogram H_pits is reset to 0 for each value of s between 0 and the maximum value of the pits, S_pits_max
  d) for each pixel p of image S(p) the following calculations are performed:
    i. if S(p) is a regional maximum,
    H_pit (S(p)) is incremented in the following way:

H_pit (S(p))←H_pit (S(p))+1

2) A second step for calculating the bump histogram H_bumps includes the following operating phases:
  a) for each pixel p of image I, the following is performed:
    i. for each direction d with 0<|d|<D
    if the following condition
    concavity of I on [p−d, p+d], i.e., $I(p+(1-2\lambda)d) \geq \lambda I(p-d)+(1-\lambda)I(p+d)$ for any $0 \leq \lambda \leq 1$ then $G(p,d)=(I(p+d)+I(p-d))/2$ is calculated or else $G(p,d)=0$ ii. S(p)=maximum value of G(p,d) is calculated for all directions d with 0<|d|<D
  b) the maximum value of the bumps S_bumps_max is calculated, which is equal to the maximum value of S(p) for all the pixels p
  c) the bump histogram H_bumps(s) is reset to 0 for each s between 0 and the maximum value of the bumps, S_bumps_max d) for each pixel p of image S(p), the following calculations are performed:
    i. if S(p) is a regional maximum
    H_bumps(S(p)) is incremented in the following way:

H_bumps (S(p))←H_bumps (S(p))+1

3) A third step for superimposing pit H_pits and bump H_bumps histograms includes the following operating steps:
  a) calculating S_max according to the expression:

$S_{max}$=Max (maximum value of the pits S_pits_max, maximum value of the bumps S_bumps_max)

b) calculating H_max according to the expression:

H_max=maximum value of the pits, H_pits(S) and of the bumps, H_bumps(S), for all values of S c) calculating s0 according to the expression:

s0=maximum value of s such that

H_pits(s)=H_max or H_bumps(s)=H_max d) s=s0+1 is calculated and α is selected such that 0<α<½ and as long as:

$|\ln(1+H\_pits(s))-\ln(1+H\_bumps(s))| < \alpha.\ln(1+H\_max)$ s=s+1 is performed (where ln is Napier's logarithm function)
    finally, value $S_{min}$ is determined by the final value of s incremented by 1

4) A step for calculating the value of the extraction threshold $V_S$ according to the relationship:

$V_S = r.S_{min}+(1-r).S_{max}$ where $½ < r \leq 1$

5) A step for comparing H_pits and H_bumps includes the following operating phases for β>0:
  a) calculating a value N_pits from the relationship N_pits=sum of H_pits(s)$^\beta$ for s=$S_{min}$ to s=S_pits_max b) calculating a value N_bumps from the relationship:

N_bumps=sum of H_bumps(s)$^\beta$ for s=$S_{min}$ to s=S_bumps_max c) if N_pits is less than N_bumps, then the dark-on-bright-background information should be extracted or else the bright-on-dark-background information should be extracted 6) A step for extracting luminance information L(p) includes the following operating phases:
  a) calculating D according to a known method
  b) for each pixel p in the difference image D(p), if D(p)>$V_S$, then D(p) is considered relevant and is extracted
    i. if the information is dark-on-bright-background information, calculating a value, L(p)=$I_{max}$−f.D(p), $I_{max}$ may be equal to 255
    ii. or else the value L(p)=$I_{min}$+f.D(p) is calculated, $I_{min}$ may be equal to 0
    If D(p) is not considered relevant
    i. if the information is dark-on-bright-background information, the value of L(p) is equal to $I_{max}$ (bright background)
    ii. or else the value of L(p) is equal to $I_{min}$ (dark background)

As an example, satisfactory results may be obtained with the following parameters:
D=3
α=20%
r=85% for extraction
f=5

Figure 13:
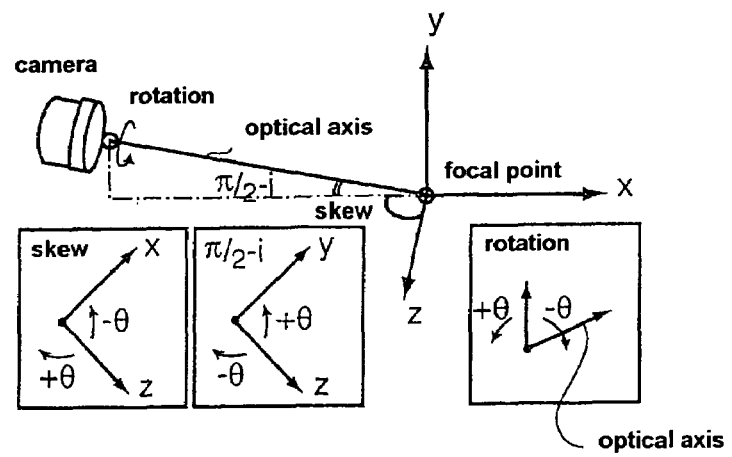
FIG. 13 is a schematic illustration for showing the main geometrical parameters of a camera.

The invention also relates to the simulation of an image of a rectangle (A,B,C,D) with a prescribed physical aspect ratio r=CD/AD, a prescribed point of the projected rectangle in the image (for example point D) and a known projected distance (for example CD) with a camera having a prescribed focal length (f), a tilt angle ($\pi/2$)–i where i is the angle of incidence), $\alpha$ is an angle of rotation around the axis of the camera and if i≠0, a prescribed skew angle ($\beta$) relatively to one of the existing vanishing points (for example $F_1$). These different parameters are indicated in FIG. 13 which schematically illustrates a camera, with its optical axis and the focal point with the ox, oy, oz coordinate reference system which is bound to this focal point.

Figure 3:
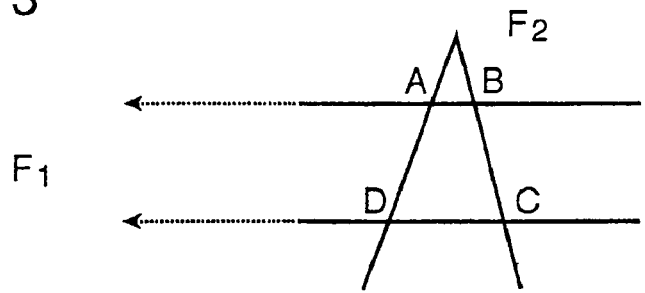
FIG. 3 is a projection of the FIG. 2 type, but wherein one of the two vanishing points is projected to infinity.
Figure 14:
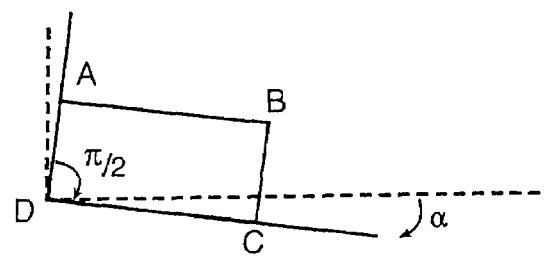
FIG. 14 is a diagram illustrating the principle for constructing a rectangular pattern having a prescribed physical aspect ratio, in the case of absence of vanishing points.

The solution of this problem comprises the three following steps which refer to FIGS. 2 and 3 and to FIG. 14, i.e.:

A first step for calculating the position of the three unknown points A, B and C (point D being prescribed) in the new image which must be generated. The points must be consistent with the physical aspect ratio r of the pattern which must be projected on this new image and the position of the camera (focal distance, tilt angle, angle of rotation, skew angle) which must be simulated.

A second step for calculating homographic relationships in order to project the information contained in the pattern of the original image on the calculated pattern of the simulated image.

A third step for determining luminance and chrominance of the new image within the contour calculated from the original image with homographic relationships.

Calculation of the three unknown points of the pattern takes into account the three following cases:

If i≠0 (there is at least one vanishing point), the calculation comprises the four following operating phases:

1. OX=f.tan(i)
2. OF=f/tan(i)
3. Points X and F are placed on a line crossing through the centre of image O and forming an angle $\alpha$ relatively to the vertical
4. Point $F_1$ is placed such that $FF_1 = f \tan(\beta)/\sin(i)$ a) if $\beta \neq 0$ (2 vanishing points)
i) point $F_2$ is placed such that $FF_2=(OF.XF)/FF_1$
ii) points $M_1, C, N_1, O_1, P_1, O_2, P_2$ and $N_2$ are inferred from points $X, F_1, F_2$ (if $\beta \neq 0$), D and from distance DC,
iii) point $M_2$ is placed so as to obtain the relationship $$r = \frac{dist(M_1, N_1)}{dist(M_2, N_2)} \cdot \frac{dist(F_1, O_1)}{dist(F_1, M_1)} \cdot \frac{dist(F_1, P_1)}{dist(F_1, N_1)} \cdot \frac{dist(F_2, M_2)}{dist(F_2, O_2)} \cdot \frac{dist(F_2, N_2)}{dist(F_2, P_2)}$$

b) if $\beta \neq 0$ (only one vanishing point: $F_1=F$) (FIG. 3)
i) point A is placed on line (DF) such that $$AF = r \cdot DF \cdot \frac{\sqrt{f^2 + OF^2}}{DC + r\sqrt{f^2 + OF^2}}$$

ii) point B is placed on line (FC) such that BF=CF.(AF/DF)
c) if i=0 (no vanishing point) (FIG. 14)
1) point C is placed by using point D, distance DC and the angle of rotation $\alpha$
2) point B is placed such that (A,B,C,D) is a rectangle.

We claim:

1. Method for extracting raw data from a digital image taken by a photographic or cinematographic camera for correcting the extracted raw data and for generating an improved digital image containing the corrected raw data, said method comprising:

determining, for each point of said image located by column C and line L of the image, a value $V_0[C, L]$ consisting of a combination of colour components of the image, expressed as:

$V_0[C, L] = \alpha$ Red $[C, L] + \beta$ green $[C, L] + \gamma$ blue $[C, L]$ wherein $\alpha, \beta, \gamma$ are coefficients satisfying the following relationship $\alpha + \beta + \gamma = 1$ $\alpha + \beta + \gamma \geq 0$ calculating, for each point of the image, a threshold value $V_{Back.}(C, L)$, calculating for each point of the image, raw data consisting in the difference $D[C, L]$ by means of the relations $D[C, L] = V_{Back.} - V_0[C, L]$ in the case where the image comprises dark data on a bright background and $V_0[C, L] - V_{Back.}$ in the case where the image comprises bright data on a dark background, and calculating a threshold value $V_S$ consisting of a noise contextual datum from at least one contrast histogram and/or from the probability q that a regional maximum of the raw data contains noise, correcting said raw data by using the threshold value $V_S$ for:

either calculating projective deformation and corrections to be made depending on said projective deformations and/or by comparing for each point of the image the value $D[C, L]$ with said threshold value $V_S$ to determine a corrected raw data value $D^*[C, L]$ to be extracted in the following way:

if $D[C, L] < V_S$ then $D^*[C, L] = 0$ if $D[C, L] \geq V_S$ then $D^*[C, L] = D[C, L]$ else $D^*[C, L] = D[C, L] - V_S$ calculating, for each point of the image, a corrected value $I^*[C, L]$ from the corrected raw data $D^*[C, L]$ by the following relation $I^*[C, L] = I_{max} - f.D^*[C, L]$ with $I_{max}$=value of a bright background or $I^*[C, L] = I_{min} + f.D^*[C, L]$ with $I_{min}$=value of a dark background storing the corrected value in a memory so as to obtain said improved image.

2. The method according to claim 1, wherein the background value $V_{Back.}$ is determined by an operating sequence comprising the following steps:

calculating for each point of the image, a value $V_{N+1}[C,L]$ which is the maximum value (when the image comprises dark data on a bright background) and the minimum value (when the image comprises bright data on a dark background) between value $V_N[C, L]$ and different averages of values of $V_N$ on symmetrical structuring items centred on [C, L], iterating said calculation a predetermined number of times (N_final) and then taking into account the values of the final image $V_{N\_final}$ as the values of the background image $V_{Back.}$.

3. The method according to claim 2, wherein the calculation of value $V_{N+1}[C,L]$ is achieved by a relationship of the type:

$$V_{N+1}[C, L] = \begin{array}{l} \max(\text{dark/bright background}) \\ (\text{or min (bright/dark background)}) \end{array}$$

$$\left\{ V_N[C, L] \frac{V_N[C+1, L+1] + V_N[C-1, L-1]}{2} \right.$$

$$\frac{V_N[C+1, L-1] + V_N[C-1, L+1]}{2}$$

$$\left. \frac{V_N[C, L+1] + V_N[C, L-1]}{2} \frac{V_N[C+1, L] + V_N[C-1, L]}{2} \right\}.$$

4. The method according to claim 1, wherein the background image $V_{Back.}$ is determined by an operating sequence comprising the following steps:

generating an image $V_{N+1}$ four times smaller than $V_N$ comprising the calculation for each point of the image, of a value $V_{N+1}[C,L]$ which is the maximum (when the image comprises dark data on bright background) and the minimum (when the image comprises bright data on a dark background) between a local average of $V_N$ centred on the point $[2C+\frac{1}{2}, 2L+\frac{1}{2}]$ and at least a local average including a larger number of pixels; image $V_{N+1}$ being four times smaller than image $V_N$, iterating said calculation a predetermined number of times N_final, and interpolating values of the image $V_{N\_Final}$ in order to obtain the values of image $V_{Back.}$ which has the same size as the initial image $V_0$.

5. The method according to claim 4, wherein the value $V_{N+1}[C, L]$ is determined by an operating sequence comprising:

$$V_{N+1}[C, L] = \begin{array}{l} \max(\text{dark/bright background}) \\ (\text{or min (bright/dark background)}) \end{array}$$

$$\left\{ \frac{V_N[2C, 2L] + V_N[2C+1, 2L] + V_N[2C, 2L+1] + V_N[2C+1, 2L+1]}{4}, \right.$$

$$(V_N[2C-1, 2L-1] + V_N[2C-1, 2L] + V_N[2C-1, 2L+1] +$$

$$V_N[2C-1, 2L+2] + V_N[2C, 2L-1] + V_N[2C, 2L] + V_N[2C, 2L+1] +$$

$$V_N[2C, 2L+2] + V_N[2C+1, 2L-1] + V_N[2C+1, 2L] +$$

$$V_N[2C+1, 2L+1] + V_N[2C+1, 2L+2] + V_N[2C+2, 2L-1] +$$

$$\left. V_N[2C+2, 2L] + V_N[2C+2, 2L+1] + V_N[2C+2, 2L+2])/16 \right\}.$$

6. The method according to claim 1, which comprises a phase for removing luminous and/or electronic noise present in the raw datum D[C,L], this noise removal phase consists of calculating the noise contextual datum $V_S$ and of comparing for each point of the image, the value D[C,L] with the threshold value $V_S$ so as to determine the value D*[C, L] to be extracted in the following way:

if D[C, L]<$V_S$ then D*[C, L]=0, if D[C, L]≧$V_S$ value D[C, L] is retained, i.e. D*[C, L]=D [C, L] or is replaced with D[C, L]−$V_S$ i.e. D*[C, L]=D [C, L]−$V_S$, the generation of image I*(p) containing the extracted data according to the subtractive principle resulting from calculating:

when the image comprises dark data on a bright background, I*(p)=$I_{max}$−f.D*(p), where $I_{max}$ is the value of the bright background which may be equal to 255, and when the image comprises dark data on a bright background, I*(p)=$I_{min}$+f.D*(p), with $I_{min}$ which may be equal to 0.

7. The method according to claim 1, wherein the calculation of $V_S$ comprises the following operating phases:

calculating the raw data to be extracted D(p)

calculating a value $S_{max}$ from D(p), and calculating the contrast histogram using D(p) and inferring the value $V_S$ from said histogram and probability q.

8. The method according to claim 7, wherein D(p) is replaced with an estimation S(p).

9. The method according to claim 8, wherein the calculation of S(p) comprises the following operating phases:

for each direction d with 0<|d|<D:

if the following condition convexity of I on [p−d, p+d] comprising

I(p+(1−2λ)d)≦λI(p−d)+(1−λ)I(p+d) for any 0≦λ≦1 in case of dark data on bright background, or concavity of I on [p−d, p+d], comprising I(p+(1−2λ)d)≧λI(p−d)+(1−λ)I(p+d) for any 0≦λ≦1 in case of bright data on dark background is satisfied, then G(p,d)=(I(p+d)+I(p−d))/2 is calculated, or else G(p,d)=0, and a value S(p) is calculated which is equal to the maximum value of G(p,d) for all directions d with 0<|d|<D.

10. The method according to claim 7, wherein said calculation of the contrast histogram and value $V_S$ comprises:

a first step wherein for each pixel p in the image D(p), if D(p) is a regional maximum, H(D(p)) is incremented according to the relationship H(D(p))←H(D(p))+1, a second step wherein the identities S=$S_{max}$ and N=1/q are determined and as long as H(S) is less than N, S is replaced with S−1, the final value of S is called $S_{min}$, N being the minimum number of regional maximum pixels such that the mathematical expected value of the number of pixels containing noise is larger than or equal to 1, and a third step wherein value $V_S$ is calculated according to formula $$V_S = r \cdot S_{min} + (1-r) \cdot S_{max}, \text{ with } \tfrac{1}{2} \leq r \leq 1.$$

11. The method according to claim 1, wherein the calculation of $V_S$ comprises the following operating phases:
when the image comprises dark data on a bright background, calculating raw data to be extracted Dpits(p) and (when the image comprises dark data on a bright background, calculating raw data to be extracted Dbumps(p),
calculating values Spits_max, wherein Spits_max comprises maximum values of the pits of Dpits(p) and Sbumps_max comprises minimum values of bumps of Dbumps(p)),
calculating contrast histogram H_pits and H_bumps from Dpits(p) and Dbumps(p), and
inferring the value of $V_S$ from the Hpits and Hbumps histograms.

12. The method according to claim 1, wherein the calculation of $V_S$ comprises the following operating phases:
when the image comprises dark data on a bright background, calculating raw data to be extracted Spits(p) and (when the image comprises dark data on a bright background, calculating raw data to be extracted Sbumps(p),
calculating values Spits_max, wherein Spits_max comprises maximum values of the pits of Spits(p) and Sbumps_max comprises minimum values of bumps of Sbumps(p)),
calculating contrast histogram H_pits and H_bumps from Spits(p) and Sbumps(p)
inferring the value of $V_S$ from the Hpits and Hbumps histograms.

13. The method according to claim 11, wherein Spits(p) and Sbumps(p) have values which are determined according to the following operating sequences:
determination of the value of Spits(p),
for each pixel p of image I, the following is performed:
for each direction d, with 0<|d|<D,
if condition
convexity of I on [p−d, p+d] comprising
I(p+(1−2λ)d)≦λI(p−d)+(1−λ)I(p+d)   for any 0≦λ≦1, representing a dark data/bright background is satisfied,
then G(p,d)=(I(p+d)+I(p−d))/2 is calculated, or else G(p,d)=0,
Spits(p)=maximum value of G(p,d) is calculated for all directions d with 0<|d|<D
determination of the value of Sbumps(p):
for each pixel p of image I, the following is performed:
for each direction d, with 0<|d|<D.
if condition
concavity of I on [p−d, p+d] comprising
I(p+(1−2λ)d)≧λI(p−d)+(1−λ)I(p+d)   for any 0≦λ≦1, is satisfied,
then G(p,d)=(I(p+d)+I(p−d))/2 is calculated, or else G(p,d)=0,
Sbumps(p)=maximum value of G(p,d) is calculated for all directions d with 0<|d|<D.

14. The method according to claim 11, wherein the calculation of the Hpits and Hbumps histograms and the calculation of $V_S$ include the following phases:
determination of the value of Hpits:
the pit histogram H_pits is reset to 0 for each value of s between 0 and the maximum value of the pits, S_pit_max,
for each pixel p of image D(p), the following calculations are performed:
i. if D(p) is a regional maximum,
H_pits(D(p)) is incremented in the following way:

H_pits(D(p))←H_pits(D(p))+1, determination of the value of Hbumps:
the bump histogram H_bump(s) is reset to 0 for each s between 0 and the maximum value of the bumps, S_bumps_max,
for each pixel p of image D(p), the following calculations are performed:
if D(p) is a regional maximum,
H_bumps(D(p)) is incremented in the following way:

H_bumps(D(p))←H_bumps(D(p))+1, the calculating $V_S$ comprising the following step:
a step for superimposing pit H_pits and bump H_bumps histograms, including the following phases:
S_max is calculated according to the expression:

S_max=Max, where maximum value of the pits S_pits_max, maximum value of the bumps S_bumps_max, H_max is calculated according to the expression:

H_max=maximum value of the pits H_pits(S) and the bumps H_bumps(S) for all values of S, s0 is calculated according to the expression:

s0=maximum value of S such that $H\_pits(S)=H\_max$, or $H\_bumps(s)=H\_max$, s=s0+1 is calculated and α is selected such that 0<α<½ and as long as:

|ln(1+H_pits(s)−ln(1+H_bump(s))|<α.ln(1+H_max)

s←s+1 is performed, wherein ln is Napier's logarithm function, and
the value $S_{min}$ is determined by the final value of s incremented by 1, and
a step for calculating the extraction threshold $V_S$ according to the relationship:

$V_S = r \cdot S_{min} + (1-r) \cdot S_{max}$ where ½<r≦1.

15. The method according to claim 1, in the case when extracted data from an image or of an image containing them, are shown according to a desired view angle, from an image taken by a camera under any incidence, which comprises the steps:
searching for at least four identifiable characteristic points of a pattern present in the image taken by the camera defining contextual data, these characteristic points may consist of corners of the image,
optionally extracting data according to predetermined criteria,
calculating geometrical deformations to be made to the raw image or to the extracted data or to the image containing them, from the relative position of the four points, with respect to relative reference positions,
determining corrections to be made to the raw image or to the extracted data or to the image containing them, depending on the geometrical deformations, and
generating a corrected image taking into account the thereby determined corrections.

16. The method according to claim 15, for obtaining a corrected image having the same proportions as the object, said method comprises the determination of the real height/width ratio of the quadrilateral defined by the points and the taking into account of this ratio r in the generation of the corrected image.

17. The method according to claim 16, wherein said quadrilateral is the projection of a rectangle, and the determination of the proportions of the rectangle is performed in accordance with a process comprising the following steps:

determining vanishing points from contours of the pattern and determining a horizon line connecting the vanishing points, determining the coordinates of the projection point F of the optical centre O of the camera on the horizon line, calculating the camera base point as orthogonal projection of the optical centre of the camera on the plane of the pattern, from distances between the vanishing points and the projection point F and from the distance between this projection point F and the optical centre O, calculating the focal length from the distances between the optical centre, the projection point F and the camera base point, calculating the coordinates of the intersection points between the vanishing lines and the lines connecting the camera base point and the vanishing points as well as points $O_1, O_2, P_1, P_2$, located on the vanishing lines, at a conventional distance from the camera base point, and calculating the ratio of the sides of the initial pattern from the coordinates calculated beforehand by considering that the rectangle $O_1, O_2, P_1, P_2$, is the projection of a square extending in the plane of the pattern.

18. The method according to claim 17, which comprises the following steps in the case when both vanishing points exist, calculating the coordinates of the point F by projecting the centre of the image O on the horizon line $(F_1, F_2)$, calculating the position of the base of the camera by its distance to point F, dist(X,F), by means of the relationship:

$$dist(X, F) = \frac{dist(F, F_1) \cdot dist(F, F_2)}{dist(O, F)}$$

calculating the focal length f with the relationship:

$$f = \sqrt{dist(O,X) \cdot dist(O,F)}$$

determining the coordinates of points $M_1, N_1, O_1$ and $P_1$ from the values calculated beforehand, determining the coordinates of points $M_2, N_2, O_2$ and $P_2$ from the values calculated earlier, and calculating the physical aspect ratio r by using the crossed ratios and the fact that the rectangle $O_1, O_2, P_1, P_2$ is the projection of a square extending in the plane of the pattern according to the relationship $$r = \frac{dist(M_1, N_1)}{dist(M_2, N_2)} \cdot \frac{dist(F_1, O_1)}{dist(F_1, M_1)} \cdot \frac{dist(F_1, P_1)}{dist(F_1, N_1)} \cdot \frac{dist(F_2, M_2)}{dist(F_2, O_2)} \cdot \frac{dist(F_2, N_2)}{dist(F_2, P_2)}.$$

19. The method according to claim 16, wherein, in the case when only one pair of vanishing lines intersect at a vanishing point whereas the other two vanishing lines are parallel, vanishing point projected to infinity, the calculation of the ratio r will be performed from a pre-established focal length f of the camera.

20. The method according to claim 19, wherein said ratio r is obtained according to the following relationship:

wherein f is $$r = \frac{dist(A, B) \cdot dist(C, D)}{(dist(C, D) - dist(A, B)) \cdot \sqrt{f^2 + dist(O, F_2)^2}}$$

the focal length of the camera, wherein the focal length f is calculated beforehand.

21. The method according to claim 16, wherein, if there is no vanishing point, the ratio r is equal to the ratio $$r = \frac{dist(A, B)}{dist(A, D)}.$$

22. The method according to claim 15, wherein, the generation of a corrected image comprises an operating sequence including the following phases:

creating an initial, deformed binary mask of the area to be corrected by isolating the useful portion of the initial image containing the extracted data and by assigning the same binary value to the pixels of this useful portion, calculating an ideal binary mask by a direct homographic transformation of the initial mask, based on the transformation of any polygonal shape into a reference polygonal shape, and for each pixel (u, v) of the ideal binary mask, calculating by inverse homography, the position (x, y) in the initial image, determining the value of the final image at pixel (u, v) by an (x, y) interpolated value in the initial image.

23. The method according to claim 22, wherein said step for creating a binary mask comprises assigning a zero value to all the pixels which are outside a quadrilateral surrounding the useful portion of the image as well as to the pixels which do not correspond to optionally extracted data.

24. The method according to claim 23, wherein the pixels are considered to be within the quadrilateral if they are always on the same side as a point G inside the quadrilateral relatively to the limits of the quadrilateral, point G may consist of the centre of gravity or the point of intersection of the diagonals.

25. The method according to the claim 1, which comprises a precalculation of the images of intermediate lines and intermediate columns in order to obtain the images of subpixels by intersection of precalculated images of intermediate lines and intermediate columns.

26. The method according to the claim 22, wherein, in the calculation of the final image, to each pixel of the ideal binary mask is assigned an intensity value which is calculated by finding the position of this pixel in the initial image or the image of the extracted data.

27. The method according to the claim 22, wherein, in the phase for calculating the final image, the images are precalculated by inverse homography of the lines and columns of the ideal mask, and in that the position of a given pixel in the initial image is then inferred by calculating the intersection of two lines.

28. The method according to claim 15, wherein the step for creating the final image comprises the calculation of the position in the deformed image of a pixel u,v of the ideal mask, by the intersection of the precalculated inverse images of line v and column u, an intersection which defines an x,y point of the initial image, and in that an intensity value is assigned to the pixel (u,v) which is then interpolated at the x,y point of the initial image or image of data extracted from the luminance image or from each colour channel.

29. The method according to claim 28, wherein the interpolation is bilinear.

30. The method according to the claim 1, which comprises determination of the colour of a pixel in the final image is performed according to a subtractive principle.

31. The method according to the claim 1, which comprises the determination of a threshold value $V_S$ in order to select values to be extracted for the extraction according to a subtractive principle of handwritten or printed information contained in the image delivered by the camera.

32. The method according to claim 31, wherein the threshold value $V_S$ corresponds to the threshold value of the gradient for removing a grid of lines and/or to a noise removal threshold.

33. The method according to claim 1, according to which extraction of information from a colour image is performed with red, green and blue colour channels, the aforementioned steps for extracting data being followed for each colour channel by the determination of a threshold for each channel, the extraction of colour information from said RGB channels and their recombination into a final colour image being made by extracting the red, green, blue values in each pixel for which it is seen that the threshold has been exceeded.

34. The method according to claim 33, wherein, for each of the pixels, one successively proceeds with extracting the luminance, extracting the raw data D(p), calculating the noise contextual datum $V_S$, extracting the noise corrected raw data D*(p) by means of the noise contextual datum, and then generating the luminance image corrected by the following calculation:

$$I^*(p) = \begin{cases} I_{max} - f \cdot D^*(p)(\text{dark data/bright})(I_{max} \text{ may be equal to 255}) \\ I_{min} + f \cdot D^*(p)(\text{bright data/dark})(I_{min} \text{ may be equal to zero}) \end{cases}.$$

35. The method according to claim 33, wherein the colour sought for the final image is obtained according to a subtractive principle comprising two steps: the background colour is estimated or set arbitrarily and then determined chrominance contrasts are removed from the background colour, as with a filter.

36. The method according to claim 35, which comprises the extraction of the noise contextual datum $V_S$, and then the extraction of the noise corrected raw data $(D^*_R, D^*_G, D^*_B)$ of the colour channels by calculating the raw data of the channels $D_R, D_G, D_B$ expressing the contrast between the observed chrominance RGB and that of the background $(V_R^{Back.}, V_G^{Back.}, V_B^{Back.})$, by thresholding with the datum and generating the corrected chrominance image by means of the relationship $$R^*G^*B^* = \begin{cases} (V_R^{Back.}, V_G^{Back.}, V_B^{Back.}) - f \cdot (D^*_R, D^*_G, D^*_B)(\text{dark data/bright}) \\ ((V_R^{Back.}, V_G^{Back.}, V_B^{Back.}) \text{ may be equal to } (255, 255, 255)) \\ (V_R^{Back.}, V_G^{Back.}, V_B^{Back.}) + f \cdot (D^*_R, D^*_G, D^*_B)/(\text{bright data/dark}) \\ ((V_R^{Back.}, V_G^{Back.}, V_B^{Back.})) \text{ may be equal to } (0, 0, 0)) \end{cases}.$$

37. The method according to claim 36, wherein, if in the original image, the chrominance of a pixel representing a white area of the supporting medium is $(V_R^{Back.}, V_G^{Back.}, V_B^{Back.}) = (160, 140, 110)$, and/or of a pixel representing a blue writing area of the supporting medium, has a chrominance $(V_R^0, V_G^0, V_B^0) = (120, 115, 105)$ and where the optical noise corrected white/blue contrast is $(D^*_R, D^*_G, D^*_B) = (160-120, 140-115, 110-105) = (40, 25, 5)$ and where, moreover, the chrominance of the pixels of the final image representing the white areas of the supporting medium is set to $(R_B, G_B, B_B) = (255, 255, 255)$, the chrominance of the pixel representing a blue writing area of the supporting medium in the final image is then determined by subtracting the contrast weighted earlier by an f factor from that of the white, so that the corrected chrominance (R*,G*,B*) of the final image at this pixel will be, if f=1, $(R^*, G^*, B^*) = (R_B - D^*_R, G_B - D^*_G, B_B - D^*_B) = (255-40, 255-25, 255-5) = (215, 230, 250)$.

38. The method according to claim 33, wherein a grey level image I(p) may either be a combination of the three colour channels of the image (red, blue, green) or one of these channels, and said method further comprises the following steps:

a first step for calculating a histogram of pits, H_pits, a second step for calculating a histogram of bumps, H_bumps, a third step for superimposing histograms of the pits and bumps, a step for comparing the H_pits and H_bumps histograms, a step for calculating the extraction threshold $V_S$, a step for extracting the raw data by means of threshold $V_S$, a step for extracting luminance information L(p), wherein the step for comparing the H_pits and H_bumps histograms includes the following operating phases, for β>0:

a) calculating a value N_pits from the relationship:

N_pits=sum of H_pits(s)$^\beta$ for s=$S_{min}$ to s=S_pits_max, b) calculating a value N_bumps from the relationship:

N_bumps=sum of H_bumps(s)$^\beta$ for s=$S_{min}$ to s=S_bumps_max, and c) if N_pits is less that N_bumps, then the dark-on-bright-background information should be extracted or else the bright-on-dark-background information should be extracted.

39. The method according to claim 38, wherein the calculation of the extraction threshold is performed according to the relationship $V_S = r \cdot S_{min} + (1-r) \cdot S_{max}$, with $\frac{1}{2} \leq r \leq 1$.

40. The method according to claims 38, wherein the step for extracting luminance information L(p) includes the following operating phases:

if the information is dark-on-bright-background information, calculating the difference image D from I, or else calculating D from $I_{max} - I$, for each pixel p in the difference image D(p), if D(p)<$V_S$, then D(p) is considered relevant and is extracted, if the information is black-on-bright-background information, calculating a value L(p)=$I_{max}$-f.D(p), $I_{max}$ may be equal to 255, or else, the value L(p)=$I_{min}$+f.D(p) is calculated, $I_{min}$ may be equal to 0, if D(p) is not considered relevant, if the information is dark-on-bright-background information, the value L(p) is equal to $I_{max}$ (bright background), $I_{max}$ may be equal to 255, or else, the value L(p) is equal to $I_{min}$ representing a dark background, $I_{min}$ may be equal to 0.

41. The method according to the claim 1, comprising simulation of an image, projected from data contained in a rectangular object with apices (A,B,C,D) having a prescribed physical aspect ratio r=CD/AB, a prescribed projected point D in the image and a known projected distance (CD), with a camera having a prescribed focal length (f), a tilt angle ((π/2)−i)

where i is the angle of incidence, an angle of rotation α around the axis of the camera and if i≠0, a prescribed skew angle (β) relatively to one of the existing vanishing points $F_1$, said method comprising the following steps:

a first step for calculating the position of the three unknown points (A,B,C) consistently with the physical aspect ratio r, a second step for calculating homographic relationships in order to project the information contained in the original rectangular object onto the simulated image, and a third step for determining luminance and chrominance of the simulated image with the homographic relationships determined earlier.

* * * * *